No. 716,220. Patented Dec. 16, 1902.
M. W. GUNN.
MACHINE FOR ASSORTING BEANS.
(Application filed Feb. 7, 1902.)

(No Model.) 2 Sheets—Sheet 1.

Witnesses:
S. C. Duvall.
R. G. Randle.

Inventor:
MOSES W. GUNN;
by his attorney,
Robert W. Randle.

THE NORRIS PETERS CO., PHOTO-LITHO., WASHINGTON, D. C.

No. 716,220. Patented Dec. 16, 1902.
M. W. GUNN.
MACHINE FOR ASSORTING BEANS.
(Application filed Feb. 7, 1902.)
(No Model.) 2 Sheets—Sheet 2.

Witnesses:
S. C. Duvall.
R. E. Randle.

Inventor:
MOSES W. GUNN,
by his attorney,
Robert W. Randle.

THE NORRIS PETERS CO., PHOTO-LITHO., WASHINGTON, D. C.

UNITED STATES PATENT OFFICE.

MOSES W. GUNN, OF LASALLE, ILLINOIS.

MACHINE FOR ASSORTING BEANS.

SPECIFICATION forming part of Letters Patent No. 716,220, dated December 16, 1902.

Application filed February 7, 1902. Serial No. 93,033. (No model.)

*To all whom it may concern:*

Be it known that I, MOSES W. GUNN, a citizen of the United States, residing at Lasalle, in the county of Lasalle and State of Illinois, have invented new and useful Improvements in Machines for Assorting Beans, of which the following is a specification.

My invention relates to an improved machine for assorting beans; and it consists, essentially, of a table and legs thereto which carry and support my mechanism, which is especially adapted to be operated by hand-power or otherwise, if desired.

The object of my present invention is to provide a machine for assorting beans (commonly termed "hand-picking") and of distributing them into various receptacles according to size and quality.

Another object is to provide a machine for assorting beans which will be simple in construction, positive in its action, strong and durable in its construction, and which can be manufactured and sold at a very low price.

Other objects and advantages will appear from the following specification and drawings and specifically pointed out in the appended claims terminating this specification.

I attain these objects by the mechanism illustrated in the drawings which form a part of this specification, in which—

Figure 1:
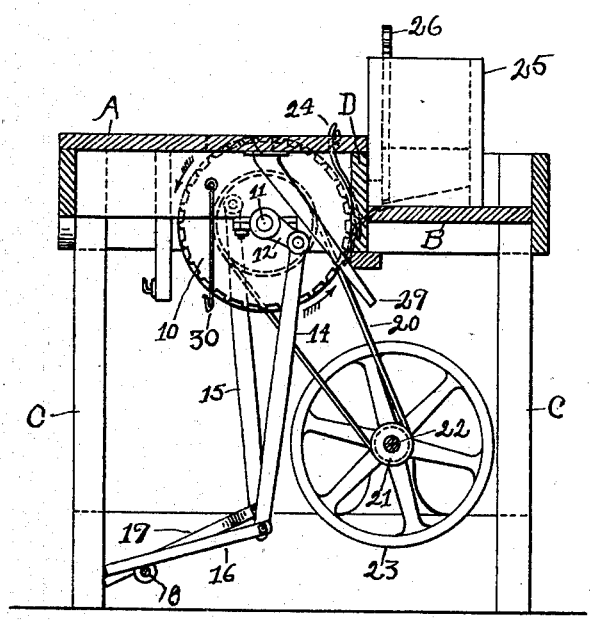
Figure 2:
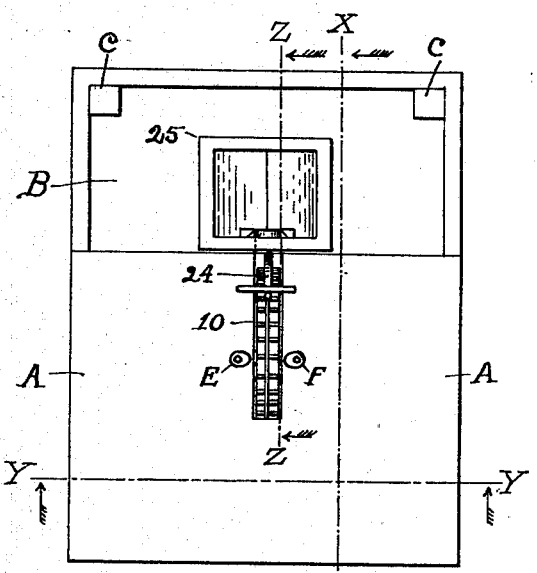
Figure 3:
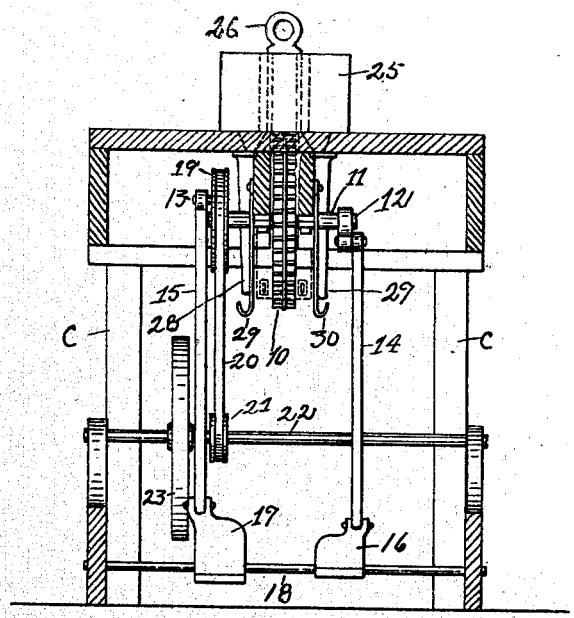
Figure 4:
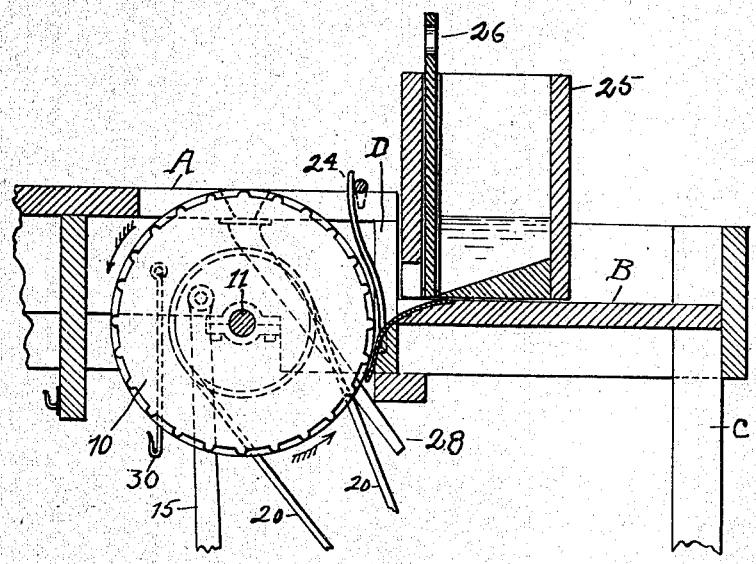

Figure 1 is a longitudinal sectional view of my machine, taken on line X X of Fig. 2. Fig. 2 is a top plan view of my entire machine. Fig. 3 is a front elevation, partly in section, taken on line Y Y of Fig. 2; and Fig. 4 is an enlarged portion of my machine, taken on line Z Z of Fig. 2.

Similar letters and figures of reference denote and refer to like parts throughout the several views.

The platforms A and B, of different elevations, the division-board D, and the four legs C constitute, substantially, the framework of my machine, to which suitable braces and guards may be added as desired.

The essential part of my machine is the wheel 10, which is revolubly mounted on the axle 11 and carried thereby. The shaft 11 is revolved by two oppositely-disposed cranks 12 and 13, connected to the pitmen 14 and 15, and they in turn to the treadles 16 and 17, which latter are mounted on the rod 18 and extend from side to side of the machine. The shaft 11 also carries a pulley-wheel 19, which is connected by a band 20 to a smaller pulley-wheel 21, which latter is secured to the shaft 22. The shaft 22 also carries the large balance or fly wheel 23. The main wheel 10 is divided on the face of its periphery into small cavities or pockets of a size just sufficient to receive loosely the size of beans to be assorted by the machine.

24 represents a resilient stationary arm of the curvature of wheel 10, which divides the beans right and left as they come to the wheel 10.

25 represents a movable hopper with a slanting bottom conducting the beans to an opening at the bottom on the inner side of 25, through which the beans pass to the wheel 10. This opening is made larger or smaller, as desired, by the sliding shutter 26.

E and F represent two holes, one on each side of the wheel 10, through the table A. These holes open into spouts 27 and 28, which lead to vessels or sacks which receive the poor-grade or spoiled beans.

29 and 30 represent hooks on which a bag can be suspended to receive the good beans which come over the wheel 10, as will hereinafter appear.

From the above explanation of the parts, taken in connection with the drawings, it will be seen that a person can be seated in front of the table A and by his feet operate the treadles 16 and 17 to cause the wheel 10 to revolve toward him, the hopper 25 being filled with hulled beans, the slide 26 being opened enough to permit a proper amount of beans to pass out of the opening in 25, where they will be taken up by the buckets or pockets in the periphery of the wheel 10 to a level with the top of A, where the operator, using both his hands, will rake the bad beans to the right and left into the holes E and F and allow the good beans to be carried on by the wheel 10, where they will be dropped into a sack provided for that purpose which can be suspended on the hooks underneath the wheel 10.

From the above it will be seen that a person can practically hand-pick a greater quantity of beans in a given time than can be done without the use of this machine.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages, and the specific construction of the details of my mechanism in which novel features are embodied may be variously changed without altering the essential principles which are claimed as new.

Having now fully shown and described my invention and the best mode for its construction and use to me known at this time, what I claim as new, and desire to secure by Letters Patent of the United States, is—

1. A bean-assorting machine, in combination with the tables A and B supported by the legs C, of the assorting-wheel 10 provided with two parallel rows of pockets or receptacles to receive the beans revolubly mounted beneath the table A and projecting even with the upper surface thereof, of a hopper 25 provided with an opening at the center of its inner side, a sliding gate for controlling said opening, said opening leading to the face of the wheel 10, small openings provided through the table A on each side of the wheel 10, and means for revolving said wheel, all substantially as shown and described.

2. A mechanism of the class described, the combination of the main supporting-frame with tables A and B at different elevations, of the assorting-wheel 10 provided with two parallel rows of pockets or receptacles to receive the beans revolving in a slot near the center of the table A and opposite an opening in D leading into the movable hopper 25, of a resilient guard or divider 24 extending upward over a portion of the face of the wheel 10, and means for revolving said wheel, all substantially as shown and described.

In testimony whereof I have signed my name to this specification in the presence of two subscribing witnesses.

MOSES W. GUNN.

Witnesses:
   I. K. NEELY,
   GEO. B. FREAT.